(12) United States Patent
Mothe et al.

(10) Patent No.: US 10,996,114 B2
(45) Date of Patent: May 4, 2021

(54) FAST RESPONSE AND ACCURATE TEMPERATURE MEASUREMENT OF A HYDRAULIC FLUID

(71) Applicant: Goodrich Corporation, Charlotte, NC (US)

(72) Inventors: Venkata AnilKumar Mothe, Bangalore (IN); Ramesh Annamareddy, Bangalore (IN); Richard William Phillips, Eagan, MN (US)

(73) Assignee: GOODRICH CORPORATION, Charlotte, NC (US)

( * ) Notice: Subject to any disclaimer, the term of this patent is extended or adjusted under 35 U.S.C. 154(b) by 215 days.

(21) Appl. No.: 16/014,840

(22) Filed: Jun. 21, 2018

(65) Prior Publication Data

US 2019/0101455 A1    Apr. 4, 2019

(51) Int. Cl.
| | | |
|---|---|---|
| *G01K 1/18* | (2006.01) | |
| *G01K 13/02* | (2021.01) | |
| *G01K 1/08* | (2021.01) | |
| *G01K 1/16* | (2006.01) | |
| *G01K 13/12* | (2006.01) | |
| *G01K 1/14* | (2021.01) | |

(52) U.S. Cl.
CPC ............ *G01K 1/18* (2013.01); *G01K 1/08* (2013.01); *G01K 1/14* (2013.01); *G01K 1/16* (2013.01); *G01K 13/02* (2013.01); *G01K 13/12* (2013.01)

(58) Field of Classification Search
CPC .. G01K 1/18; G01K 1/08; G01K 1/16; G01K 13/12; G01K 1/14; G01K 13/02
See application file for complete search history.

(56) References Cited

U.S. PATENT DOCUMENTS

| | | |
|---|---|---|
| 7,168,330 B1 | 1/2007 | Nyffenegger |
| 7,467,891 B2 | 12/2008 | Gennissen et al. |

(Continued)

OTHER PUBLICATIONS

Extended European Search Report dated Feb. 11, 2019, received for corresponding European Application No. 18197007.0.

(Continued)

*Primary Examiner* — Brandi N Hopkins
*Assistant Examiner* — Janice M Soto
(74) *Attorney, Agent, or Firm* — Kinney & Lange, P.A.

(57) ABSTRACT

Apparatus and associated methods relate to measuring temperature of a fluid within a hydraulic vessel using a temperature probe that has an annular recess circumscribing a projecting sensor tip. The annular recess is configured to permit fluid flow into an aperture region of a vessel wall through which the temperature probe contacts the fluid within the hydraulic vessel. Because the temperature probe projects from the annular recess within the aperture, a net projection dimension, as measured in a projection direction from an interior surface of the vessel wall proximate the aperture to a sensor, is less than a gross projection dimension, as measured in the projection direction from a bottom of the annular recess to the sensor tip. In some embodiments, this configuration advantageously improves a ratio of thermal conductivity between the fluid and the temperature probe and thermal conductivity between the temperature probe and a sensor housing.

19 Claims, 8 Drawing Sheets

(56) References Cited

U.S. PATENT DOCUMENTS

| | | | |
|---|---|---|---|
| 7,954,994 B2 * | 6/2011 | Warth | G01L 19/0092 |
| | | | 374/143 |
| 8,118,486 B2 | 2/2012 | Nyffenegger | |
| 2010/0327849 A1 * | 12/2010 | Kamen | A61M 1/3621 |
| | | | 324/105 |

OTHER PUBLICATIONS

European Office Action dated Mar. 27, 2020, received for corresponding European Application No. 18197007.0, 5 pages.

* cited by examiner

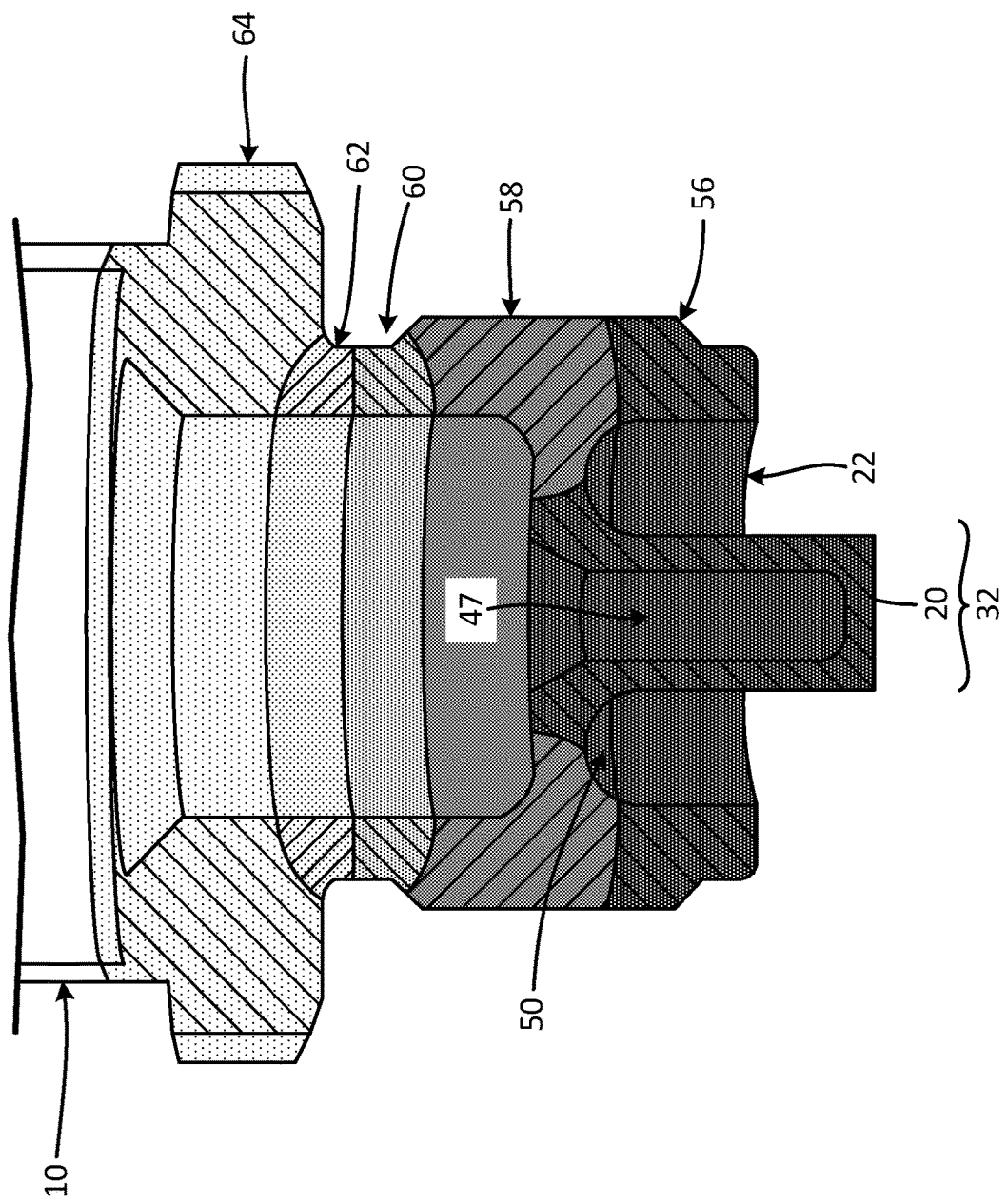

FAST RESPONSE AND ACCURATE TEMPERATURE MEASUREMENT OF A HYDRAULIC FLUID

CROSS-REFERENCE TO RELATED APPLICATION(S)

This application claims priority from Indian Patent Application No. 201741034670, filed Sep. 29, 2017, entitled "FAST RESPONSE AND ACCURATE TEMPERATURE MEASUREMENT OF A HYDRAULIC FLUID", by Venkata Anil Kumar Mothe, Ramesh Annamareddy, and Richard W. Phillips, which is hereby incorporated by reference.

BACKGROUND

Measuring temperatures of a fluid in a hydraulic vessel can be performed by providing thermal conduction between a temperature sensor and the fluid in the hydraulic vessel. A temperature sensing system can have a sensing tip that is inserted into the hydraulic vessel so as to make thermal contact with the fluid. Often, an aperture or connecting portal in a vessel wall of the hydraulic vessel is used for providing access to the interior of the hydraulic vessel. The temperature sensor can be configured to sealably couple to the connecting portal in such a manner as to present the sensing tip to the fluid in the hydraulic vessel, while sealing the connecting portal so that the fluid doesn't leak outside of the hydraulic vessel via the connecting portal.

A sensing tip can have a barrier wall configured to provide thermal coupling between a temperature sensor within the temperature sensing system and the fluid, while providing a barrier to fluid flow from outside the temperature sensing system to inside the temperatures sensing system. The barrier wall can also provide thermal coupling within the barrier wall from a center of the sensing tip to the periphery of the sensing tip, to the vessel wall connected thereto, and to the environment outside of the hydraulic vessel. If the temperatures of the vessel wall and the outside environments are not at equilibrium with the fluid within the hydraulic vessel, these competing thermal conduction routes can cause the temperature sensor to be at a temperature not equal to the temperature of the fluid within the hydraulic vessel.

SUMMARY

Apparatus and associated methods relate to a system for sensing a temperature of a fluid within a hydraulic vessel. The system includes a temperature sensor, a barrier wall, and a vessel connector. The barrier wall has a first surface thermally coupled to the temperature sensor and a second surface, opposite the first surface, configured to directly contact the fluid within the hydraulic vessel. The vessel connector is configured so as to present the second surface of the barrier wall to the fluid within the hydraulic vessel via an aperture in the vessel wall extending between an exterior surface of the vessel wall to an interior surface of the vessel wall. The vessel connector is further configured to circumferentially seal the hydraulic vessel about the aperture. The barrier wall has an annular recessed portion circumscribing a projecting portion. The annular recessed portion is configured to form, when coupled to the hydraulic vessel via the vessel connector, an annular recess into a portion of the aperture. The projecting portion projects from the annular recessed portion in a projection direction substantially perpendicular to a region adjacent to the aperture of the interior surface of the vessel wall. A cavity is formed on a first-surface side of the projecting portion of the barrier wall, within which the temperature sensor is located.

Some embodiments relate to a method for sensing a temperature of a fluid within a hydraulic vessel. The method includes sensing a temperature within a cavity formed by a first surface of a barrier wall. The method includes presenting a second surface of the barrier wall, opposite the first surface of the barrier wall, to the fluid within the hydraulic vessel via an aperture in a vessel wall of the hydraulic vessel. The aperture extends from an outer surface to an inner surface of a vessel wall. The method includes directly contacting the fluid within the hydraulic vessel via the second surface of the barrier wall. The method includes circumferentially sealing the hydraulic vessel about the aperture. The method also includes providing fluid flow into an annular portion of the aperture circumscribing a projection of the second surface opposite the cavity formed by the first surface of the barrier wall.

BRIEF DESCRIPTION OF THE DRAWINGS

FIG. 2 is a diagram of a simulated steady-state temperature response to a heated fluid within a hydraulic vessel of the barrier wall and the vessel connector of the temperature measurement system depicted in FIGS. 1A-1B.

DETAILED DESCRIPTION

Apparatus and associated methods relate to measuring temperature of a fluid within a hydraulic vessel using a temperature probe that has an annular recess circumscribing a projecting sensor tip. The annular recess is configured to permit fluid flow into an aperture region of a vessel wall through which the temperature probe contacts the fluid within the hydraulic vessel. Because the temperature probe projects from the annular recess within the aperture, a net projection dimension, as measured in a projection direction from an interior surface of the vessel wall proximate the aperture to a sensor, is less than a gross projection dimension, as measured in the projection direction from a bottom of the annular recess to the sensor tip. In at least some embodiments, this configuration advantageously improves a ratio of thermal conductivity between the fluid and the temperature probe and thermal conductivity between the temperature probe and a sensor housing.

Figure 1A:
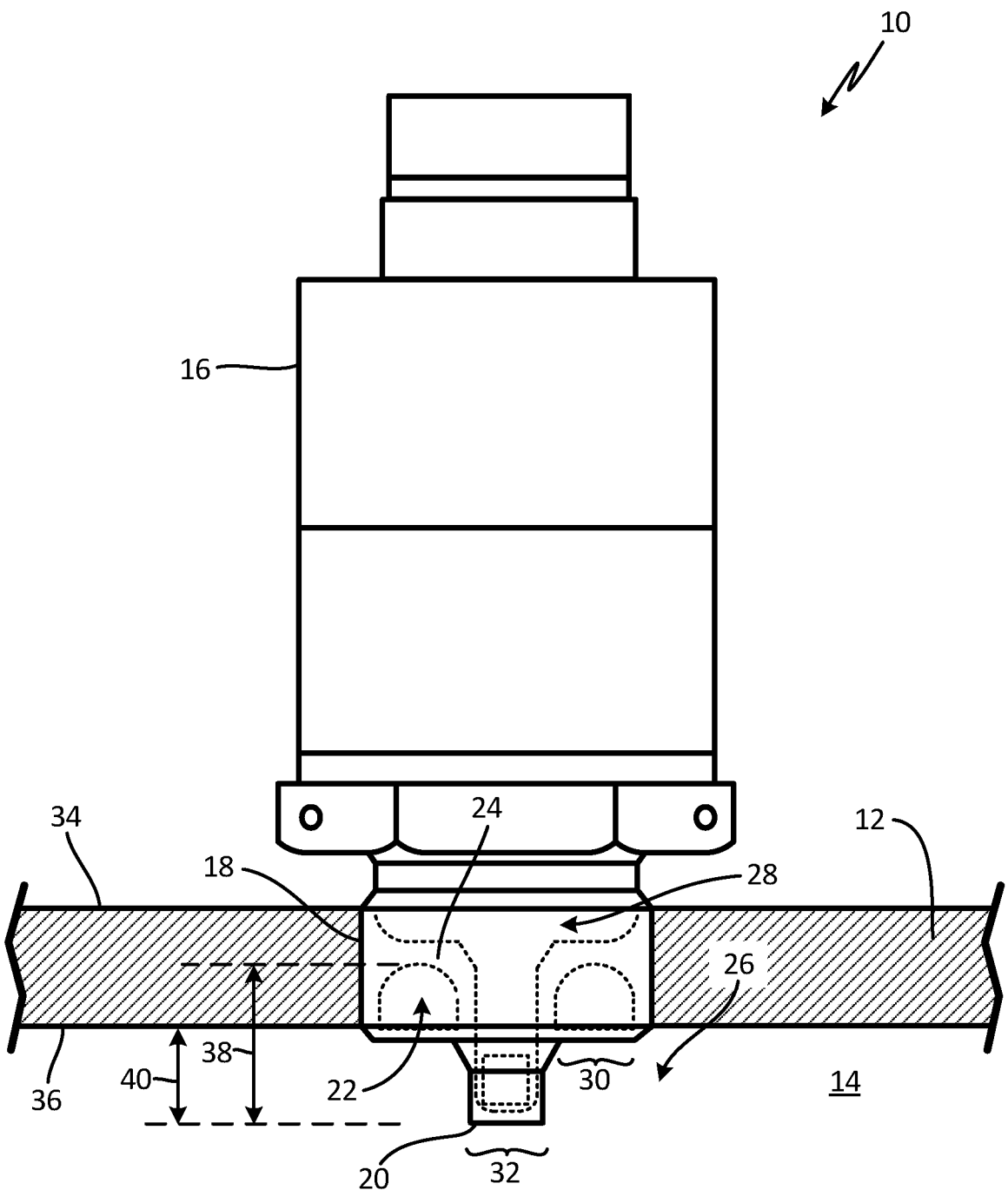
FIG. 1A is a side elevation view of an exemplary temperature measurement system with an annular recess circumscribing a projecting sensor tip.

FIG. 1A is a side elevation view of an exemplary temperature measurement system with an annular recess circumscribing a projecting sensor tip. In FIG. 1A, temperature measurement system 10 is coupled to vessel wall 12 of a hydraulic vessel containing fluid 14. Temperature measurement system 10 includes body 16, vessel connector 18, sensor tip 20, and annular recess 22. Body 16 contains an electronic temperature processor within and has a communications module for communicating a processed temperature measurement with another device. In some embodiments, the communications module is configured to provide wired and/or wireless communications.

Vessel wall 12 has an aperture, through which sensor tip 20 projects so as to make thermal contact with fluid 14 within the hydraulic vessel. In the depicted embodiment, vessel connector 18 has a substantially cylindrical exterior surface that is threaded. Vessel wall 12 can have a complementary substantially cylindrical surface adjacent to the aperture. The complementary substantially cylindrical surface can be threaded so as to sealably couple to vessel connector 18 of temperature measurement system 10. In some embodiments, sealable coupling can include an O-ring, a gasket, etc. Sealable coupling between temperature measurement system 10 and vessel wall 12 prevents fluid 14 from leaking out of the hydraulic vessel.

Sensor tip 20 and annular recess 22 are formed by barrier wall 24. Barrier wall 24 prevents fluid transport from exterior region 26 to interior region 28 of temperature measurement system 10. Barrier wall 24 has annular recess portion 30 circumscribing projecting portion 32. Annual recess portion 30 forms annular recess 22 within a volume of the aperture in vessel wall 12. The aperture in vessel wall 12 can be defined to be the volume between a plane connecting exterior surface 34 and spanning the aperture of vessel wall 12 and a plane connecting interior surface 36 and spanning the aperture of vessel wall 12. The volume defined between such planes can be called the aperture volume. Such spanning planes are the natural planes or minimal area planes that span the aperture of vessel wall 12. Annular recess 22 is configured to permit fluid flow into a portion of the aperture volume thus defined. Such fluid flow therein increases effective (or gross) projection dimension 38 of sensor tip 20, for a given net projection dimension 40 into the hydraulic vessel. Conversely, annular recess 22 decreases net projection dimension 40, for a given effective (or gross) projection dimension 38.

Figure 1B:
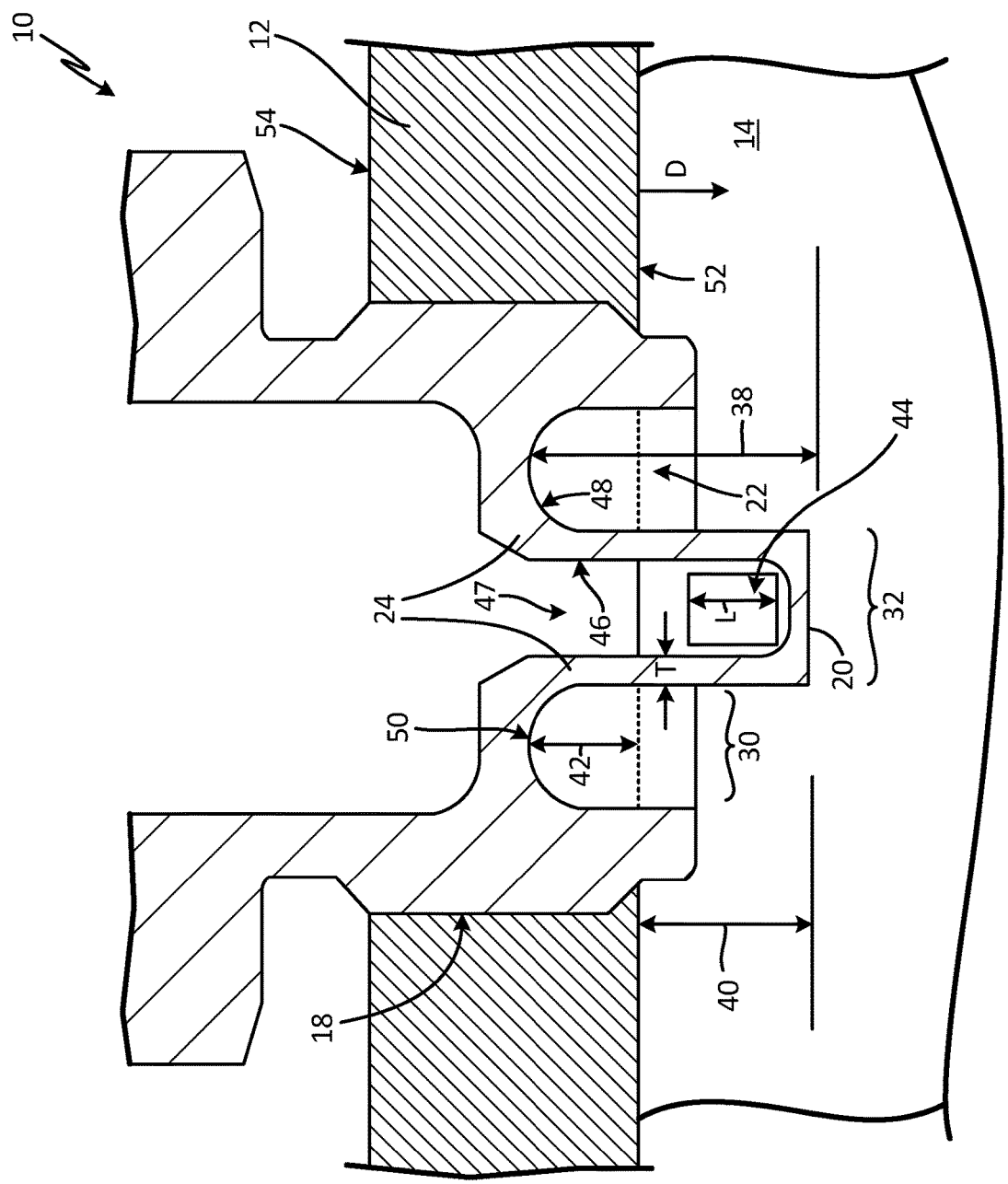
FIG. 1B is a close-up view of a barrier wall of the temperature measurement system depicted in FIG. 1A.

FIG. 1B is a close-up view of barrier wall 24 of the temperature measurement system depicted in FIG. 1A. In FIG. 1B, temperature measurement system 10 is shown in cross section so as to better depict barrier wall 24. Barrier wall 24 has annular recess portion 30 circumscribing projecting portion 32. Barrier wall 24 has first or interior surface 46 thermally coupled to temperature sensor 44. Interior surface 46 of projecting portion 32 forms cavity 47, in which temperature sensor 44 is located. Barrier wall 24 has second or exterior surface 48 in direct contact with fluid 14. Exterior surface 48 of annular recess portion 30 forms annular recess 22, within which fluid 14 can flow. Annular recess 22 has recess dimension 42 into the aperture volume. Net projection dimension 40 is equal to gross projection dimension 38 minus recess dimension 42. Gross projection dimension 38 can be measured from bottom 50 of annular recess 22 to sensor tip 20 in a projection direction D substantially perpendicular to interior surface 52 of vessel wall 12 adjacent to the aperture. In some embodiments, a ratio of gross projection dimension 38 to net projection dimension 40 can be greater than 1.5, 2 or 3, for example. Temperature sensor 44 has element length L as measured in the projection direction D. In some embodiments, a ratio of gross projection dimension 38 to element length L is greater than 2.0, 2.5 or 3, for example.

The barrier wall configuration depicted in FIG. 1B can provide good accuracy as well as fast transient response. Good thermal accuracy can be obtained when temperature sensor 44 is at substantially the same temperature as fluid 14. Heat is conducted from fluid 14 through barrier wall 24 to temperature sensor 44. Such heat transfer increases with decreasing thickness T of barrier wall 24 and with increasing surface area of barrier wall 24 adjacent to temperature sensor 44. By forming cavity 47, every surface of temperature sensor 44, except a top surface is in thermal contact with interior surface 46 of barrier wall 24. Furthermore, because of the configuration of projecting portion 32, thickness T of barrier wall 24 can be reduced and still have sufficient strength to withstand exposure to high fluid pressures. In some embodiments, projecting portion 32 has a substantially cylindrical shape. Such a cylindrical shape permits barrier walls 24 of small thicknesses T to withstand pressures that planar barrier walls, which have substantially the same area, can withstand only with larger thicknesses T.

Heat is also conducted away from temperature sensor 44 via barrier walls 24 to vessel connector 18, to body 16 (depicted in FIG. 1A), and to an environment of both the hydraulic vessel and temperature measurement system 10. The greater the ratio of heat conduction toward temperature sensor 44 to heat conduction away from temperatures sensor 44, the greater will be the accuracy and/or the response time of temperature measurement system 10. Heat conducted away from temperature sensor 44 increases with increasing thickness T of barrier wall 24. Heat conducted away from temperature sensor 44 decreases with increasing path length of barrier wall 24 from temperature sensor 44 to parts of temperature measurement system 10 that are not at equilibrium with fluid 14, such as, for example, vessel connector 18.

Thus, forming projecting portion 32 and recess portion 30 of barrier wall 24 can advantageously increase the path length of deleterious thermal conduction away from temperature sensor 44, and decrease the path length of desirable thermal conduction toward temperature sensor 44, thereby improving accuracy. In some embodiments, a ratio of the thermal resistance from temperature sensor 44 to the vessel connector 18 to the thermal resistance from temperature sensor 44 to the second surface 46 of projecting portion 32 of the barrier wall 24 is greater than 10, 20, or 50 times, for example.

FIG. 2 is a diagram of a simulated steady-state temperature response to heated fluid 14 within a hydraulic vessel of barrier wall 24 and vessel connector 18 of temperature measurement system 10 depicted in FIGS. 1A-1B. In FIG. 2, temperature measurement system 10 has been shaded to reflect the steady-state temperatures of various regions of barrier wall 24 and vessel connector 18. The simulation modeled temperature measurement system 10 is connected to a hydraulic vessel containing a liquid at a temperature of 148.9° C. The environment external to the hydraulic vessel and temperature measurement system 10 is at ambient air temperature or 71° C. First shading zone 56 indicates regions of temperature measurement system 10 that is about 148.9° C. Second 58, third 60, fourth 62, and fifth 64 shading zones indicate regions of decreasing steady-state temperatures. As indicated in FIG. 2, projection region 32 extending from bottom 50 of annular recess 22 to sensor tip 20 is everywhere at a temperature of at least 121.1° C. Inside cavity 47, where temperature sensor 44 (depicted in FIG. 1B) resides, the temperature is at or near the temperature at sensor tip 20. At sensor tip 20, the temperature is at 146° C., only 3° C. less than the fluid temperature of 148.9° C.

The geometry of barrier wall 24 as depicted in FIG. 1B, can also improve the response time of temperature measurement system 10 to a dynamic temperature of fluid 14. The temperature response time τ can be modeled by the following equation:

$$\tau = \frac{c\rho V}{hA} \quad (1)$$

Here, c is the effective heat capacity of temperature measurement system 10, ρ is the effective density, V is the effective volume, A is the effective surface area, and h is the heat transfer coefficient. Thus, the geometry of barrier wall 24 provides large surface area, while simultaneously providing a small effective volume, thereby providing fast response to dynamic temperature variations.

Figure 3:
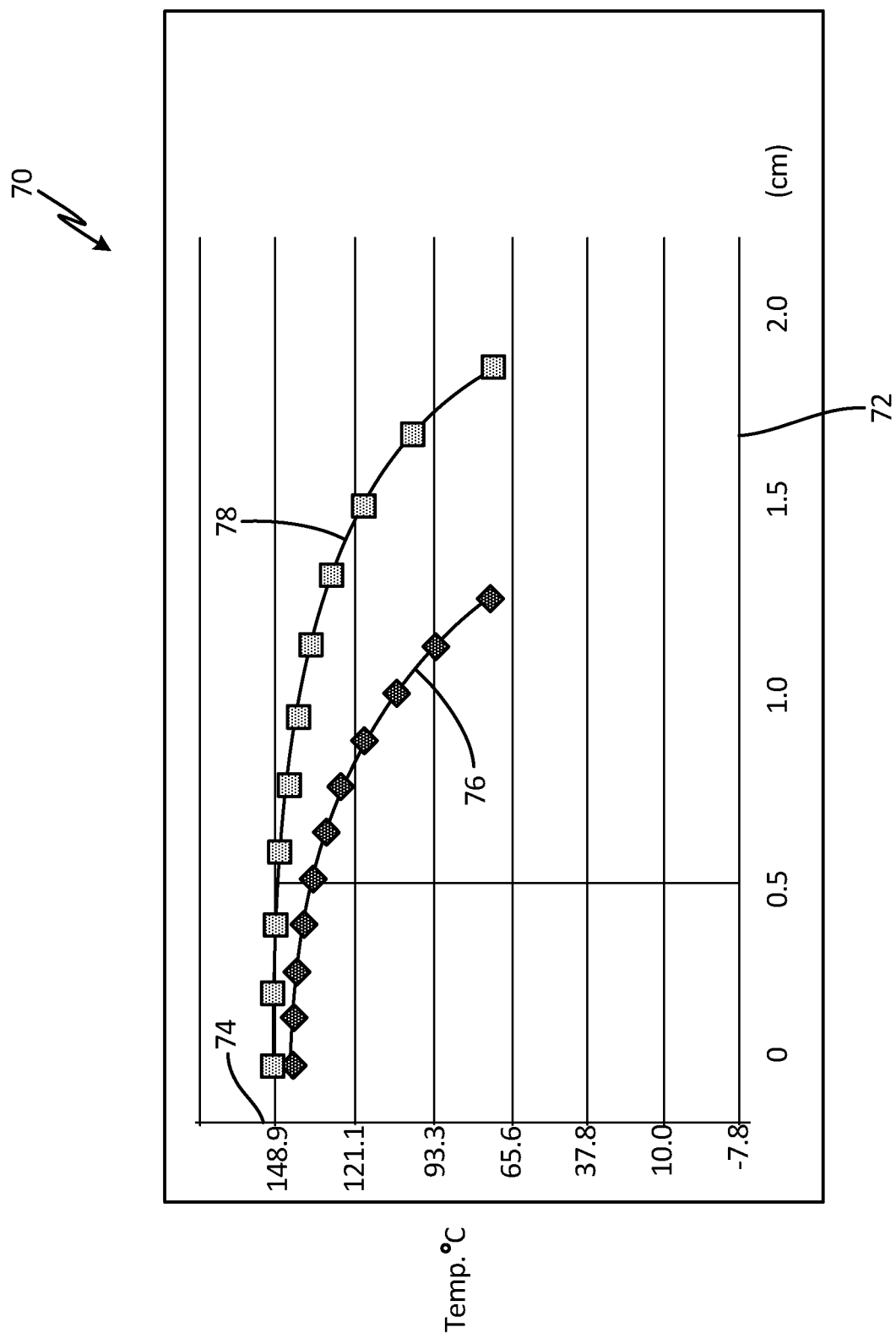
FIG. 3 is a graph of temperature vs. barrier wall location of two temperature sensors having different gross projection dimensions of sensor tip.

FIG. 3 is a graph of temperature vs. barrier wall location of two temperature sensors having different gross projection dimensions of sensor tip. Graph 70 has horizontal axis 72, vertical axis 74, first temperature-distance relation 76, and second temperature-distance relation 78. Horizontal axis 72 is indicative of a distance along barrier wall 24 from a center of sensor tip 22 toward vessel connector 18 (depicted in FIG. 1B). Vertical axis 74 is indicative of a temperature of the barrier wall 24 at the location indicated by the various horizontal coordinates of each of first and second temperature-distance relations 76 and 78.

Temperature-distance relation 76 corresponds to a temperature measurement system that has a gross projection dimension of 1.27 cm. When exposed to a fluid of temperature 148.9° C., the temperature of barrier wall 44 at sensor tip 22 is 144° C. As one progresses away from sensor tip 22, the temperature decreases, crossing below 120° C. at a distance of 1.10 cm from sensor tip 22.

Temperature-distance relation 78 corresponds to a temperature measurement system that has a gross projection dimension of 1.91 cm. When exposed to a fluid of temperature 148.9° C., the temperature of barrier wall 44 at sensor tip 22 is 147° C. As one progresses away from sensor tip 22, the temperature decreases, crossing below 120° C. at a distance of 1.45 cm from sensor tip 22. Thus, the longer the gross projection dimension of projecting portion 32 of barrier wall 24, the closer will be the temperature at sensor tip 22 to the temperature of fluid 14 which sensor tip 22 directly contacts. Also, the temperature of temperature sensor 44 will be closer to the temperature of fluid 14 as more of the surface area opposite cavity 47 is at a temperature close to the temperature of fluid 14.

Figure 4B:
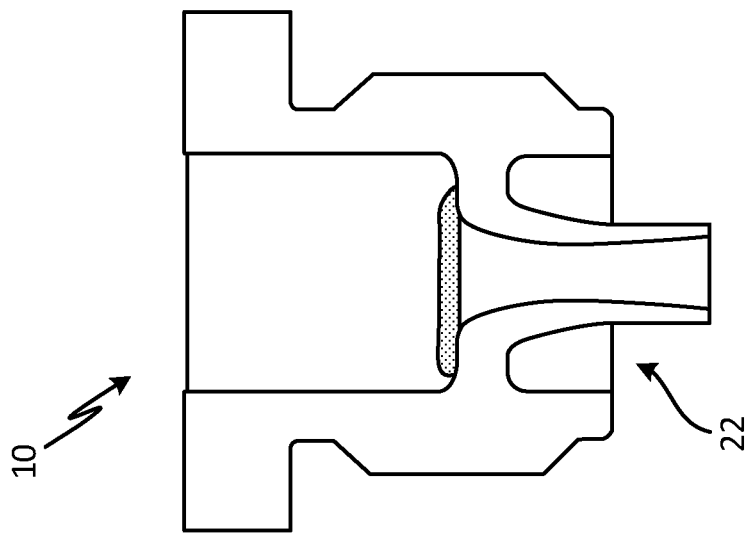
FIGS. 4A-4B depict simulated stress responses of two different barrier wall configurations to a pressurized fluid.
Figure 4A:
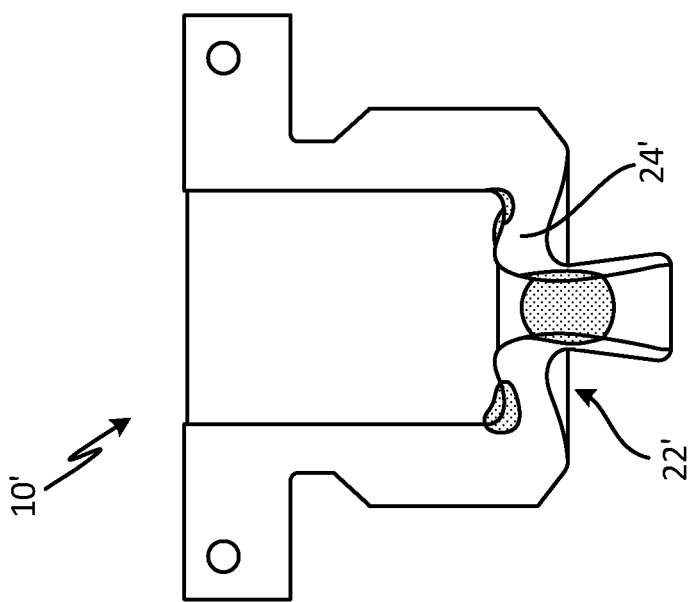

FIGS. 4A-4B depict simulated stress responses of two different barrier wall configurations to a pressurized fluid. Both the embodiments depicted in FIGS. 4A and 4B are shown with exaggerated deformation in response to exposure to a high-pressure fluid. FIG. 4A depicts an embodiment of temperature measurement system 10' that has no annular recess in an unstressed state. Although temperature measurement system 10' has no annular recess in an unstressed state, when exposed to a high-pressure fluid, barrier wall 24' deforms creating a modest annular recess 22'. The embodiment depicted in FIG. 4B is a temperature measurement system 10 that has annular recess 22 in an unstressed state. Temperature measurement system 10 tolerates exposure to high pressure better than the FIG. 4A embodiment. Both temperature measurement systems 10 and 10' have been shaded to indicate stress in response to exposure to a high-pressure fluid. In both FIGS. 4A and 4B, the pressure of the fluid, to which temperature measurement systems 10 and 10' have been exposed, is 51,710 kPa. The maximum stress of temperature measurement system 10' is 345 kPa, while the maximum stress of temperature measurement system 10 is only 207 kPa. The deep annular recess profile of the FIG. 4B embodiment can result in an increased ability to withstand exposure to high-pressure fluids.

Figure 5:
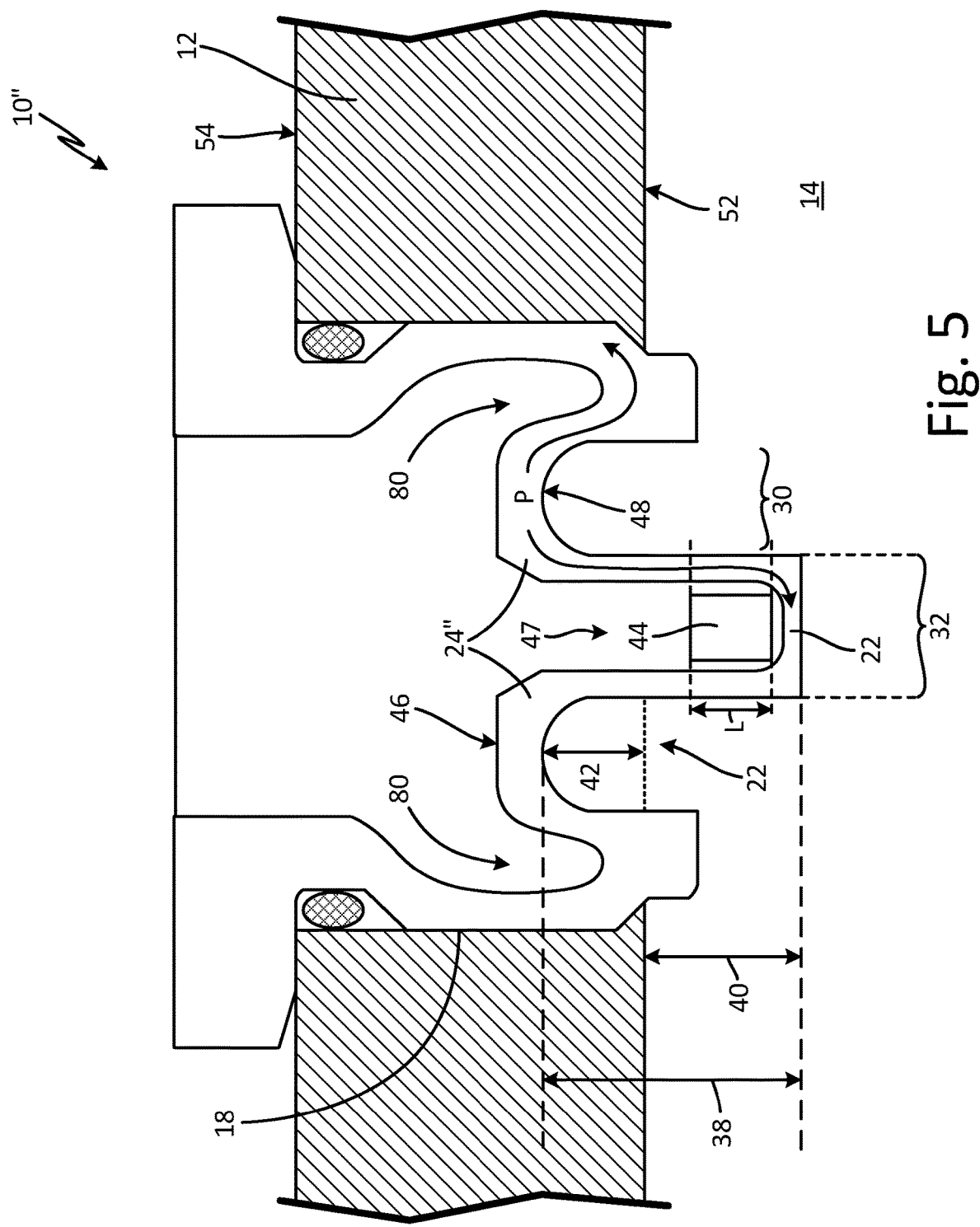
FIG. 5 is a close-up view of a barrier wall of another embodiment of a temperature measurement system.

FIG. 5 is a close-up view of a barrier wall of another embodiment of a temperature measurement system. In FIG. 5, temperature measurement system 10" is shown in cross section so as to better depict barrier wall 24", which differs from barrier wall 24 of temperature measurement system 10 depicted in FIG. 1B. Like barrier wall 24 of the FIG. 1B embodiment, barrier wall 24" has annular recess portion 30 circumscribing projecting portion 32. Barrier wall 24" has first or interior surface 46 thermally coupled to temperature sensor 44. Interior surface 46 of projecting portion 32 forms cavity 47, in which temperature sensor 44 is located. Barrier wall 24" has second or exterior surface 48 in direct contact with fluid 14. Exterior surface 48 of annular recess portion 30 forms annular recess 22, within which fluid 14 can flow. Annular recess 22 has recess depth 42 into the aperture volume. Net projection dimension 40 is again equal to gross projection dimension 38 minus recess dimension 42. Gross projection dimension 38 can be measured from bottom 50 of annular recess 22 to sensor tip 20 in a projection direction D substantially perpendicular to interior surface 52 of vessel wall 12 adjacent to the aperture.

The barrier wall 24" configuration depicted in FIG. 5, however has an increased path length P from sensor tip 22 to vessel connector 18. This increased path length is a result of the barrier wall connecting to vessel connector 18 near the interior surface 52 of vessel wall 12. The barrier wall 24" does not connect to vessel connector 18 at the region between exterior and interior surfaces 54 and 52 of vessel wall as the FIG. 1B embodiment depicts. The longer path length P between the center of sensor tip 22 to vessel connector 18 of the FIG. 5 embodiment can result in a higher thermal resistance between sensor tip 22 to vessel connector 18 via barrier wall 24".

Figure 6A:
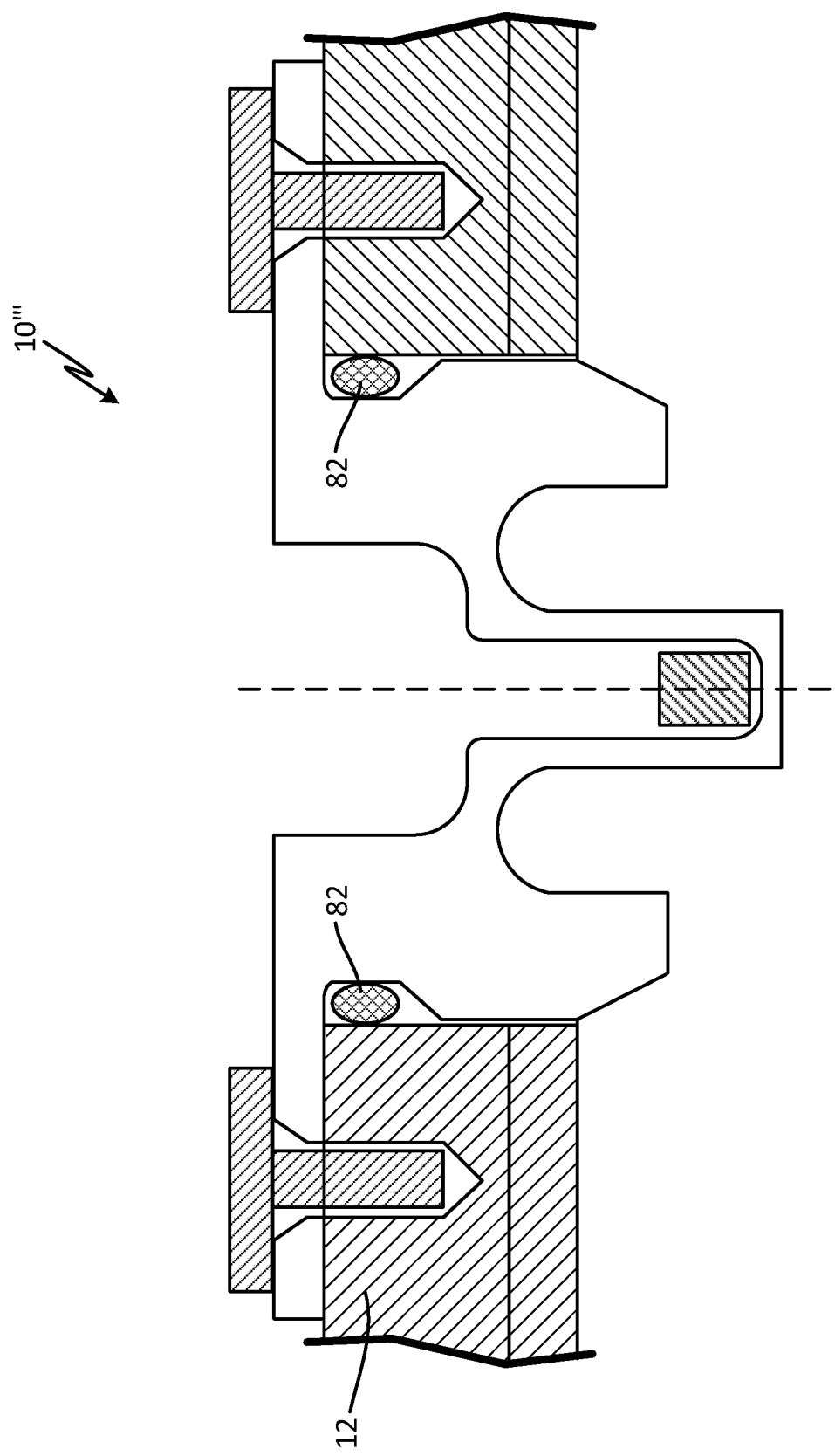
FIGS. 6A-6B are cross-sectional views of flange mounted temperature measurement systems mounted to a barrier wall.
Figure 6B:
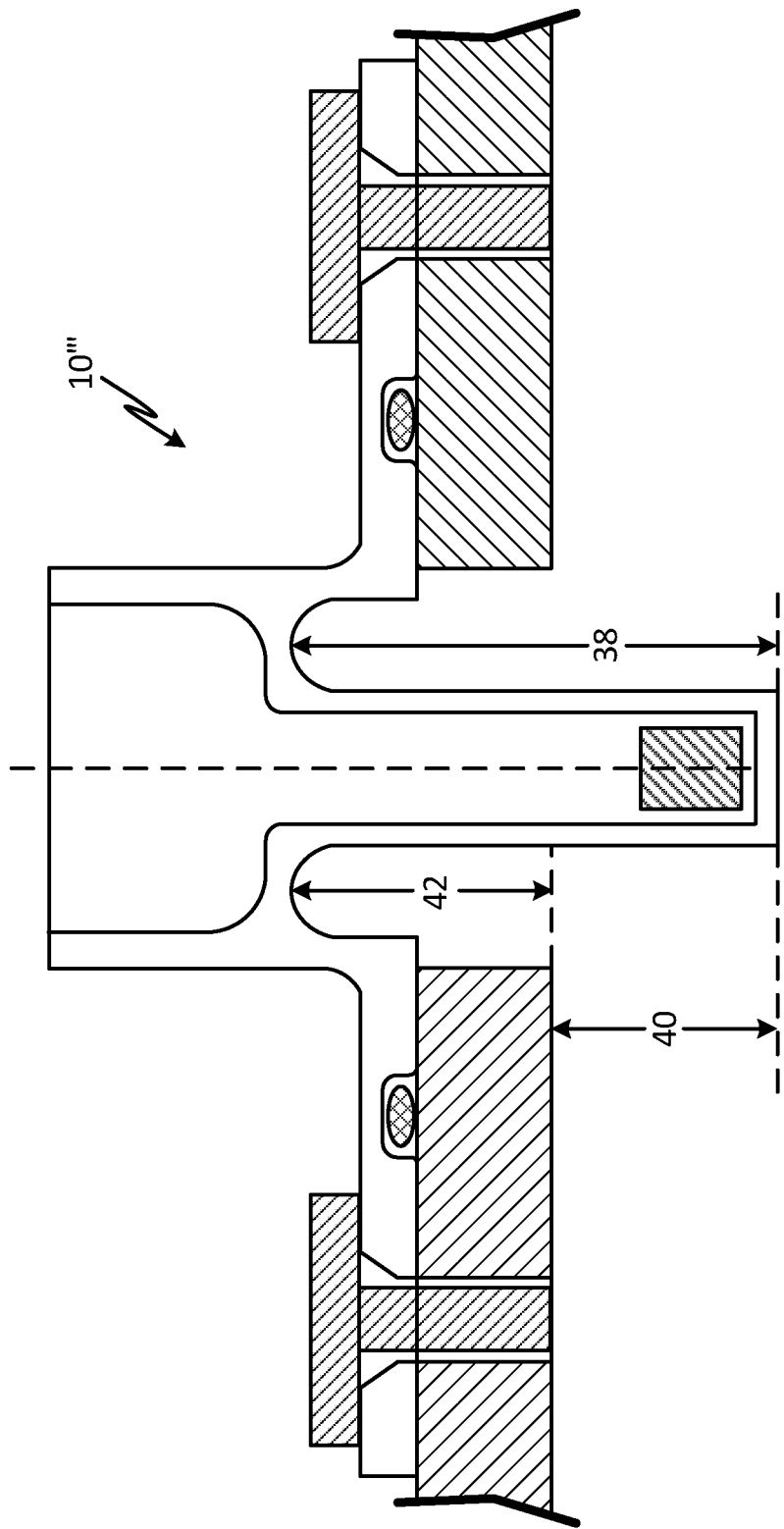

FIGS. 6A-6B are cross-sectional views of flange mounted temperature measurement systems mounted to a barrier wall. In FIG. 6A, temperature measurement system 10''' is shown in cross section so as to depict the flange connection system of the embodiment. Temperature measurement system 10''' couples to barrier wall 12 via the depicted flanges and bolts. Temperature measurement system 10''' makes a sealed connection to barrier wall 12 via O-ring 82. In FIG. 6B, temperature measurement system 10'''' is shown in cross section so as to depict the deep aperture recess 22" that can be achieved. Temperature measurement system 10'''' couples to barrier wall 12 via the depicted flanges and bolts. In the depicted embodiment, recess depth 42 is greater than an aperture thickness (e.g., thickness of barrier wall 12). By providing such a large recess depth 42, net projection dimension 40 can be small even with a large gross projection dimension 38.

DISCUSSION OF POSSIBLE EMBODIMENTS

The following are non-exclusive descriptions of possible embodiments of the present invention.

Apparatus and associated methods relate to a system for sensing a temperature of a fluid within a hydraulic vessel. The system includes a temperature sensor, a barrier wall, and a vessel connector. The barrier wall has a first surface thermally coupled to the temperature sensor, and a second surface, opposite the first surface, configured to directly contact the fluid within the hydraulic vessel. The vessel connector is configured so as to present the second surface of the barrier wall to the fluid within the hydraulic vessel via an aperture in a vessel wall extending between an exterior surface of the vessel wall to an interior surface of the vessel wall. An aperture volume is defined between a first surface extending the exterior surface of the vessel wall so as to span the aperture and a second surface extending the interior surface of the vessel wall so as to span the aperture. The vessel connector is further configured to circumferentially seal the hydraulic vessel about the aperture. The barrier wall has an annular recessed portion circumscribing a projecting portion. The annular recessed portion is configured to form, when coupled to the hydraulic vessel via the vessel connector, an annular recess into a portion of the aperture volume. The projecting portion projects from the annular recessed portion in a projection direction substantially perpendicular second surface. A cavity is formed by a first-surface of the projecting portion of the barrier wall within which the temperature sensor is located.

The system of the preceding paragraph can optionally include, additionally and/or alternatively, any one or more of the following features, configurations and/or additional components:

A further embodiment of the foregoing system, wherein a net projection dimension, as measured in the projection direction from the interior surface of the vessel wall proximate the aperture to a tip of the projecting portion of the barrier wall, can be less than a gross projection dimension, as measured in the projection direction from a bottom of the annular recessed portion to the tip of the projecting portion of the barrier wall.

A further embodiment of any of the foregoing systems, wherein a ratio of the gross projection dimension to the net projection dimension can be greater than 1.5.

A further embodiment of any of the foregoing systems, wherein a ratio of the gross projection dimension to the net projection dimension can be greater than 2.0.

A further embodiment of any of the foregoing systems, wherein a ratio of the thermal resistance from the temperature sensor to the vessel connector can be greater than ten times the thermal resistance from the temperature sensor to the second surface of the projecting portion of the barrier wall.

A further embodiment of any of the foregoing systems, wherein the vessel connector can include a cylindrical threaded surface configured to engage a complementary threaded surface of the vessel wall surrounding the aperture.

A further embodiment of any of the foregoing systems, wherein the vessel connector can include a flange configured to connect to a flange connection site on the exterior surface of the vessel wall.

A further embodiment of any of the foregoing systems, wherein a ratio of the gross projection dimension to an element length, as measured in the projection direction, can be greater than 2.

A further embodiment of any of the foregoing systems, wherein ratio of the gross projection dimension to an element length, as measured in the projection direction, can be greater than 3.

A further embodiment of any of the foregoing systems, wherein the projecting portion of the barrier wall can be substantially cylindrical between the annular recess and the tip of the projecting portion.

A further embodiment of any of the foregoing systems, wherein the projecting portion of the barrier wall can be configured to be substantially centered within the aperture.

Some embodiments relate to a method for sensing a temperature of a fluid within a hydraulic vessel. The method includes sensing a temperature within a cavity formed by a first surface of a barrier wall. The method includes presenting a second surface of the barrier wall, opposite the first surface of the barrier wall, to the fluid within the hydraulic vessel via an aperture in a vessel wall of the hydraulic vessel. The aperture extends from an exterior surface to an interior surface of a vessel wall. An aperture volume is defined between a first surface extending the exterior surface of the vessel wall so as to span the aperture and a second surface extending the interior surface of the vessel wall so as to span the aperture. The method includes directly contacting the fluid within the hydraulic vessel via the second surface of the barrier wall. The method includes circumferentially sealing the hydraulic vessel about the aperture. The method also includes providing fluid flow into an annular portion of the aperture circumscribing a projection of the second surface opposite the cavity formed by the first surface of the barrier wall.

The method of the preceding paragraph can optionally include, additionally and/or alternatively, any one or more of the following features, configurations and/or additional components:

A further embodiment of the foregoing method can further include projecting the projection of the second surface into the hydraulic vessel in a direction substantially perpendicular to the second surface.

A further embodiment of any of the foregoing methods can further include providing fluid flow about the projection of the second surface.

A further embodiment of any of the foregoing methods, wherein a net projection dimension, as measured in the projection direction from the interior surface of the vessel wall proximate the aperture to a tip of the projecting portion of the barrier wall, can be less than a gross projection dimension, as measured in the projection direction from a bottom of the annular recessed portion to the tip of the projecting portion of the barrier wall.

A further embodiment of any of the foregoing methods, wherein a ratio of the gross projection dimension to the net projection dimension can be greater than 1.5.

A further embodiment of any of the foregoing methods, wherein a ratio of the gross projection dimension to the net projection dimension can be greater than 2.0.

A further embodiment of any of the foregoing methods, wherein a ratio of the thermal resistance from the temperature sensor to the vessel connector can be greater than ten times the thermal resistance from the temperature sensor to the second surface of the projecting portion of the barrier wall.

A further embodiment of any of the foregoing methods, wherein circumferentially sealing the hydraulic vessel about the aperture can include threadably engaging a connecting surface about the barrier wall to a threaded surface of the vessel wall surrounding the aperture.

A further embodiment of any of the foregoing methods, wherein circumferentially sealing the hydraulic vessel about the aperture can include engaging, via a flange, a connecting surface about the barrier wall to an engagement surface of the vessel wall surrounding the aperture.

A further embodiment of any of the foregoing methods, wherein a ratio of the gross projection dimension to an element length, as measured in the projection direction, can be greater than 2.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for sensing a temperature of a fluid within a hydraulic vessel, the system comprising:
a temperature sensor;
a barrier wall configured to span an aperture in a vessel wall of the hydraulic vessel, the barrier wall having an exterior surface and an interior surface opposite the exterior surface, the exterior surface configured to directly contact the fluid within the hydraulic vessel; and
a vessel connector configured so as to present the exterior surface of the barrier wall to the fluid within the hydraulic vessel via an aperture in the vessel wall extending between an exterior surface of the vessel wall to an interior surface of the vessel wall, an aperture volume defined between an exterior spanning plane extending the exterior surface of the vessel wall so as to span the aperture and an interior spanning plane extending the interior surface of the vessel wall so as to span the aperture, the vessel connector further configured to circumferentially seal the hydraulic vessel about the aperture,
wherein the barrier wall has an annular recessed portion immediately adjacent and circumscribing a projecting portion, the annular recessed portion configured to form, when coupled to the hydraulic vessel via the vessel connector, an annular recess into a portion of the aperture volume, the projecting portion projecting from the annular recessed portion in a projection direction substantially perpendicular to the interior spanning plane, a cavity being formed on an interior side of the projecting portion of the barrier wall within which the temperature sensor is located, wherein the projecting portion of the barrier wall is cylindrical between the annular recess and the tip of the projecting portion.

2. The system of claim 1, wherein a net projection dimension, as measured in the projection direction from the interior surface of the vessel wall proximate the aperture to a tip of the projecting portion of the barrier wall, is less than a gross projection dimension, as measured in the projection direction from a bottom of the annular recessed portion to the tip of the projecting portion of the barrier wall.

3. The system of claim 2, wherein a ratio of the gross projection dimension to the net projection dimension is greater than 1.5.

4. The system of claim 2, wherein a ratio of the gross projection dimension to the net projection dimension is greater than 2.0.

5. The system of claim 2, wherein a ratio of the thermal resistance from the temperature sensor to the vessel connector is greater than ten times the thermal resistance from the temperature sensor to the exterior surface of the projecting portion of the barrier wall.

6. The system of claim 2, wherein a ratio of the gross projection dimension to an element length, as measured in the projection direction, is greater than 2.

7. The system of claim 2, wherein ratio of the gross projection dimension to an element length, as measured in the projection direction, is greater than 3.

8. The system of claim 1, wherein the vessel connector comprises a cylindrical threaded surface configured to engage a complementary threaded surface of the vessel wall surrounding the aperture.

9. The system of claim 1, wherein the vessel connector comprises a flange configured to connect to a flange connection site on the exterior surface of the vessel wall.

10. The system of claim 1, wherein the projecting portion of the barrier wall is configured to be substantially centered within the aperture.

11. A method for sensing a temperature of a fluid within a hydraulic vessel, the method comprising:
sensing a temperature within a cavity formed on an interior side of a projecting portion of a barrier wall configured to span an aperture in a vessel wall of the hydraulic vessel, the barrier wall having interior and exterior surfaces;
presenting the exterior surface of the barrier wall to the fluid within the hydraulic vessel via the aperture in the vessel wall, the aperture extending from an exterior surface to an interior surface of a vessel wall, an aperture volume defined between an exterior spanning plane extending the exterior surface of the vessel wall so as to span the aperture and an interior spanning plane extending the interior surface of the vessel wall so as to span the aperture;
directly contacting the fluid within the hydraulic vessel via the exterior surface of the barrier wall;
circumferentially sealing the hydraulic vessel about the aperture; and
providing fluid flow into an annular recessed portion of the aperture immediately adjacent and circumscribing the projecting portion of the barrier wall, the annular portion configured to form, with the hydraulic vessel, an annular recess into a portion of the aperture volume, wherein the projecting portion of the barrier wall is cylindrical between the annular recess and the tip of the projecting portion.

12. The method of claim 11, further comprising:
projecting the projection portion of the barrier wall into the hydraulic vessel in a direction substantially perpendicular to the exterior spanning plane.

13. The method of claim 11, further comprising:
providing fluid flow about the projecting portion of the barrier wall.

14. The method of claim 11, wherein a net projection dimension, as measured in the projection direction from the interior surface of the vessel wall proximate the aperture to a tip of the projecting portion of the barrier wall, is less than a gross projection dimension, as measured in the projection direction from a bottom of the annular recessed portion to the tip of the projecting portion of the barrier wall.

15. The method of claim 14, wherein a ratio of the gross projection dimension to the net projection dimension is greater than 1.5.

16. The method of claim 14, wherein a ratio of the thermal resistance from the temperature sensor to the vessel connector is greater than ten times the thermal resistance from the temperature sensor to the projecting portion of the barrier wall.

17. The method of claim 14, wherein a ratio of the gross projection dimension to an element length, as measured in the projection direction, is greater than 2.

18. The method of claim 11, wherein circumferentially sealing the hydraulic vessel about the aperture comprises:
   threadably engaging a connecting surface about the barrier wall to a threaded surface of the vessel wall surrounding the aperture.

19. The method of claim 11, wherein circumferentially sealing the hydraulic vessel about the aperture comprises:
   engaging, via a flange, a connecting surface about the barrier wall to an engagement surface of the vessel wall surrounding the aperture.

* * * * *